Feb. 2, 1926.
F. A. STIRRUP
1,571,609
ICE CREAM FREEZER
Filed Oct. 20, 1923
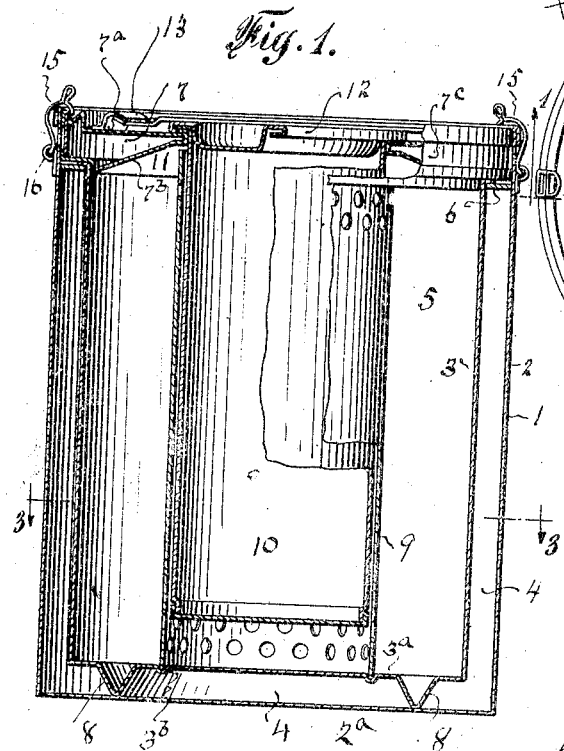
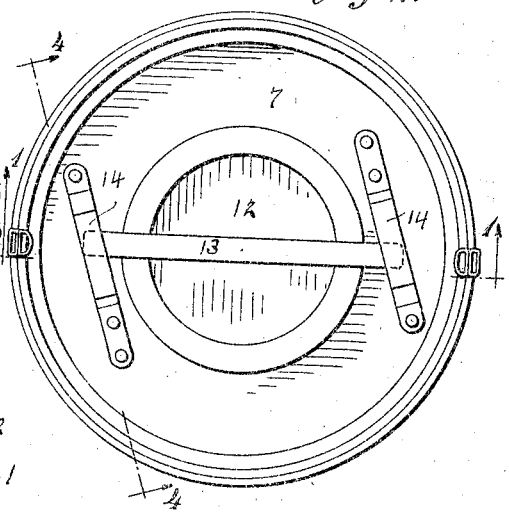
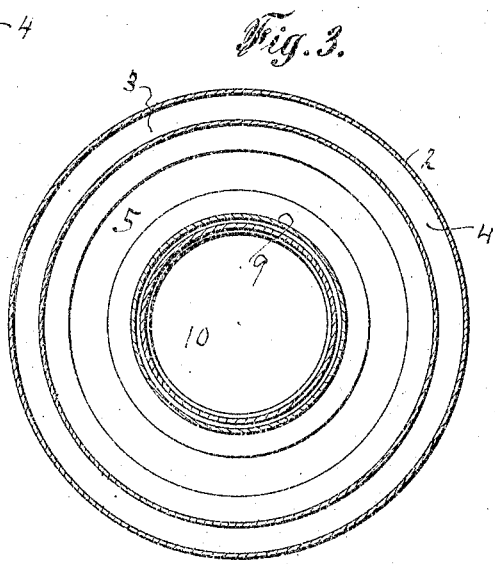
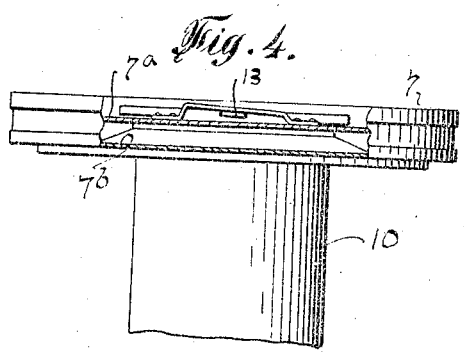
INVENTOR
Frank A. Stirrup
BY
P. A. Bourne
his ATTORNEY Patented Feb. 2, 1926.

1,571,609

UNITED STATES PATENT OFFICE.

FRANK A. STIRRUP, OF WESTFIELD, NEW JERSEY.

ICE-CREAM FREEZER.

Application filed October 20, 1923. Serial No. 669,657.

*To all whom it may concern:*

Be it known that I, FRANK A. STIRRUP, a citizen of the United States, and resident of Westfield, in the county of Union and State of New Jersey, have invented certain new and useful Improvements in Ice-Cream Freezers, of which the following is a specification.

My invention relates to improvements in ice cream freezers and particularly to the class of freezers in which ice cream, water ices and the like may be frozen and cooled without requiring the freezer to be rotated.

An object of my invention is to provide a simple, cheap and effective ice cream freezer wherein the freezing mixture may be inserted in a suitable compartment in the main casing that is open at one end of the freezer, and whereby a chamber for the materials to be frozen may be inserted into the said compartment, at said open end, to detachably be supported upon the casing, the chamber depending therein from a main cover for the casing, a perforated cylinder within the casing, open at its outer end, being adapted to receive the chamber, the perforations in said cylinder permitting cold brine to enter the same and excluding ice therefrom.

My invention comprises novel details of improvement that will be more fully hereinafter set forth and then pointed out in the claims.

Reference is to be had to the accompanying drawings forming a part hereof, wherein—

Fig. 1 is a partly sectional view substantially on the line 1, 1 in Fig. 2;

Fig. 2 is a plan view of the freezer;

Fig. 3 is a section on line 3, 3, in Fig. 1, and

Fig. 4 is a detail partly in section on line 4, 4, in Fig. 2.

Similar numerals of reference indicate corresponding parts in the several views.

The main casing of the freezer is indicated generally at 1 shown as double walled comprising an outer cylinder or shell 2 and an inner cylinder or shell 3 suitably spaced therefrom, providing an air space 4 for insulating purposes. The freezing compartment 5 is within the shell 3, and is open at one end. The bottom $3^a$ of shell 3 is spaced from the bottom $2^a$ of shell 2. The outer end of air space 4 is closed by a ring-like member 6 suitably soldered to the shells 2 and 3 and affording a ledge to support the main cover 7. To brace the bottom of shell 3 against the bottom of shell 2 I provide a projection 8 extending from the bottom $3^a$ to the bottom $2^a$, which projection is shown formed integral with the bottom $3^a$ and may be made by stamping or spinning the metal thereof in an outward direction. Within the shell 3 is a perforated cylinder 9 secured at its inner end to bottom $3^a$, and open at its opposite end through the main opening of shell 3. The open end of cylinder 9 is shown projecting beyond the member 6 so that when the shell 3 is charged with a freezing mixture, say nearly up to the member 6, the ice in the mixture will not overflow into the cylinder 9. The lower end of cylinder 9 may be secured to bottom $3^a$ in any suitable manner, such as by soldering, and by preference I provide the bottom $3^a$ with a downwardly extending annular groove $3^b$, within the annular projection 8, to receive the adjacent end of cylinder 9 for centering the same on said bottom in soldering the parts together and prevent said cylinder from being moved sideways out of its normal central location in shell 3.

The chamber 10, for the ice cream or other material to be frozen or cooled, is provided with a closed bottom and is secured to the main cover 7, the upper end of the chamber 10 opening through said cover. The cover 7 is shown provided with double walls comprising an outer wall $7^a$ and an inner wall $7^b$ attached together by an outer rim $7^c$, which parts may be soldered together, the walls $7^a$ and $7^b$ being shown provided with central openings in which the adjacent end of chamber 10 is tightly fitted and preferably soldered thereto. The marginal portion of wall $7^b$ is adapted to rest upon the upper edge of the shell 3 with the cover 7 fitting within the edge of shell 2 that extends beyond member 6, whereby the cover is removably retained within the outer diameter of the main body of the freezer. The chamber 10 is of such length as not to extend to the bottom $3^a$ of shell 3 so that a space will be provided between said bottom and the inner end of chamber 10 for the freezing mixture admitted through the perforations of cylinder 9. The chamber 10 is of less diameter than the interior space of cylinder 9 to admit freezing mixture therebetween. The wall $7^b$ of cover 7 is shown converging from its outer portion toward the opening therein providing the recess 11 into which the upper or outer end of cylinder 9 fits when the cover is in position in the casing. The cover 7 supports chamber 10 and said chamber is provided with a removable cover 12 which may be secured in place by any suitable means. I have shown the cover 12 provided with a bar 13, suitably secured thereto and projecting at opposite ends beyond the periphery of said cover, said ends of said bar being adapted, when the cover is rotated, to pass under spaced straps 14 secured on cover 7 on opposite sides of its main opening. When cover 12 is rotated in one direction its bar 13 will cooperate with the straps 14 to retain the cover tightly closed on chamber 10, and when cover 12 is rotated in the opposite direction it will be released for removal. The cover 7 may be detachably retained upon the main body or casing by any suitable means, such as by spring-like clips 15 shown pivotally supported at 16 on the outside of shell 2.

In using my improved freezer the cover 7 with its attached freezing chamber 10 may be removed from the main body or shells of the freezer, with the latter resting upon its bottom 2ª, and the freezing mixture will be inserted in the spaces between shell 3 and cylinder 9 to a suitable height so as not to overflow into the top of said cylinder. The ice cream mixture or other material to be frozen or cooled will be placed in chamber 10, (which may be done when the chamber is separate from the casing), the cover 12 secured on chamber 10, and said chamber with the main cover 7 will be placed in position so that the chamber 10 will enter the cylinder 9 and will hang therein from the cover 7 which will rest within the main body. The freezer so charged may be left for a suitable period and the freezable mixture or material in chamber 10 will be frozen without requiring the freezer to be rotated. When it is desired to remove the frozen material the cover 7 with the attached chamber 10 may be removed from the freezer so that the frozen material may be extracted from chamber 10 without any danger that the freezing mixture will enter said chamber.

An advantage of my invention is that the freezer can always remain resting upon its bottom 2ª for charging with the freezable mixture, as well as for insertion and removal of the chamber 10, without requiring freezer as a whole to be turned upside down. A further advantage is that the interior of shell 3 and cylinder 9 may be cleaned thoroughly through their wide open ends, and the chamber 10 as well as the main cover 7, also may be thoroughly cleaned since they are removable from the main casing.

Having now described my invention, what I claim is:—

1. An ice cream freezer comprising a casing having an open end and double walls spaced apart and provided with a member closing the outer end of the space between said walls, the outer wall extending beyond the inner wall, a perforated cylinder secured at its inner end to a wall of said casing and having an open outer end opening through the open end of said casing, a cover for the open end of the casing adapted to be supported upon the inner wall of the casing within the outer end of the latter, said cover having an opening, and a chamber depending from said cover adapted to fit within said cylinder, said chamber having an open end opening through said opening in said cover, and a cover for said chamber, the outer end of the perforated cylinder extending beyond the inner wall of the casing, the main cover being recessed on its inner side around its opening to receive the adjacent end of the cylinder.

2. An ice cream freezer comprising a casing having double walls spaced apart and provided with opposing bottoms, the bottom of the inner wall having a projection extending to the bottom of the outer wall, means to close the opposite ends of the walls, said casing having an open end opposite said bottoms, a perforated cylinder within the inner shell having an open end opening through the first named open end, a cover for the casing, a chamber secured to and extending from the cover and provided with an open end opening through the cover, and a cover for said chamber.

3. An ice cream freezer as set forth in claim 2, in which the inner bottom is provided with a groove and the adjacent end of the perforated cylinder is secured within said groove.

FRANK A. STIRRUP